United States Patent
Nakamura et al.

(10) Patent No.: US 11,306,237 B2
(45) Date of Patent: Apr. 19, 2022

(54) LATENT-HEAT STORAGE MATERIAL COMPOSITION AND LATENT-HEAT STORAGE TANK

(71) Applicant: TOHO GAS CO., LTD., Nagoya (JP)

(72) Inventors: Kohei Nakamura, Nagoya (JP); Takashi Ina, Nagoya (JP)

(73) Assignee: TOHO GAS CO., LTD., Nagoya (JP)

( * ) Notice: Subject to any disclaimer, the term of this patent is extended or adjusted under 35 U.S.C. 154(b) by 112 days.

(21) Appl. No.: 16/487,871

(22) PCT Filed: Feb. 19, 2018

(86) PCT No.: PCT/JP2018/005692
§ 371 (c)(1),
(2) Date: Aug. 22, 2019

(87) PCT Pub. No.: WO2018/168340
PCT Pub. Date: Sep. 20, 2018

(65) Prior Publication Data
US 2020/0239756 A1    Jul. 30, 2020

(30) Foreign Application Priority Data
Mar. 13, 2017 (JP) .............................. JP2017-047673

(51) Int. Cl.
C09K 5/06        (2006.01)
F28D 20/02       (2006.01)

(52) U.S. Cl.
CPC .............. C09K 5/063 (2013.01); F28D 20/02 (2013.01)

(58) Field of Classification Search
CPC ........... C09K 5/063; C09K 5/06; F28D 20/02; F28D 20/00; F28F 23/02; Y02E 60/14
See application file for complete search history.

(56) References Cited

U.S. PATENT DOCUMENTS 8,231,804 B2 *  7/2012  Abhari ...................... C10L 1/04
                                                       585/16
9,315,710 B2 *  4/2016  Abhari ................... F28D 20/023
(Continued)

FOREIGN PATENT DOCUMENTS

CN        106928908 A    7/2017
GB        2 134 532 A    8/1984
(Continued)

OTHER PUBLICATIONS

Mar. 17, 2021 Second Office Action issued in Chinese Patent Application No. 201880015217.6.
(Continued)

Primary Examiner — Ljiljana V. Cinc
(74) Attorney, Agent, or Firm — Oliff PLC

(57) ABSTRACT

A latent-heat storage material composition includes: a latent-heat storage material for storing or releasing heat by utilizing absorption or release of latent heat in association with phase change; and additives mixed with the latent-heat storage material. The additives can adjust a property of the latent-heat storage material. The additives include a first additive, which is a water-soluble substance belonging to polysaccharides and is gellan gum, which is also a thickener for increasing the viscosity of a melt of the latent-heat storage material composition in a liquid phase state, based on interaction of the thickener with water contained in the latent-heat storage material composition and cations. The content of the gellan gum is 1 wt % or less of the weight of the whole latent-heat storage material composition.

14 Claims, 10 Drawing Sheets

(56) References Cited

U.S. PATENT DOCUMENTS

| | | | |
|---|---|---|---|
| 9,963,627 B2* | 5/2018 | Rajagopalan | F28D 20/023 |
| 10,094,622 B2* | 10/2018 | Honda | F28D 20/028 |
| 10,921,064 B2* | 2/2021 | Machida | B01D 9/0013 |
| 2002/0031339 A1 | 3/2002 | Hirano | |
| 2016/0272864 A1* | 9/2016 | Abhari | C09K 5/063 |
| 2016/0370084 A1 | 12/2016 | Bessho et al. | |

FOREIGN PATENT DOCUMENTS

| | | |
|---|---|---|
| GB | 2 134 532 B | 11/1985 |
| JP | S62-270679 A | 11/1987 |
| JP | H03-041185 A | 2/1991 |
| JP | H11-092757 A | 4/1999 |
| JP | 2009-256518 A | 11/2009 |
| JP | 2013-087276 A | 5/2013 |
| JP | 2015-140363 A | 8/2015 |
| JP | 2017-052866 A | 3/2017 |
| JP | 2018-077035 A | 5/2018 |
| WO | 2014/208222 A1 | 12/2014 |

OTHER PUBLICATIONS

Oct. 30, 2020 Office Action issued in European Patent Application No. 18766954.4.
Sep. 4, 2020 Office Action issued in Chinese Patent Application No. 201880015217.6.
Sep. 17, 2019 International Preliminary Report on Patentability issued in International Application No. PCT/JP2018/005692.
Mar. 13, 2018 International Search Report issued in International Application No. PCT/JP2018/005692.
Jan. 27, 2020 extended Search Report issued in European Patent Application No. 18766954.4.
Sep. 3, 2021 Office Action issued in Chinese Patent Application No. 201880015217.6.

* cited by examiner

FIG. 8

| | | Presence/Absence of LA gellan gum | Content ratio [wt%] | | | Melting peak [°C] | Amount of heat storage [kJ/kg] |
|---|---|---|---|---|---|---|---|
| | | | Aluminum alum dodecahydrate | LA gellan gum | Mannitol | | |
| Example (Experiment 1) | Upper side | Present | 91 | 1 | 8 | 89 | 221 |
| | Lower side | | | | | 87 | 233 |
| Comparative Example (Experiment 2) | Upper side | Absent | 92 | 0 | 8 | 87 | 157 |
| | Lower side | | | | | 87 | 253 |

LATENT-HEAT STORAGE MATERIAL COMPOSITION AND LATENT-HEAT STORAGE TANK

CROSS-REFERENCE TO RELATED APPLICATIONS

This is a US national phase application based on the PCT International Patent Application No. PCT/JP2018/005692 filed on Feb. 19, 2018, and claiming the priority of Japanese Patent Applications No. 2017-047673 filed on Mar. 13, 2017, the entire contents of which are herewith incorporated by reference.

TECHNICAL FIELD

The present invention relates to a latent-heat storage material composition, in which a latent-heat storage material capable of storing heat or releasing heat utilizing the phenomenon of latent heat absorption and release of latent heat in association with phase change is mixed with an additive capable of adjusting a property of the latent-heat storage material, and a latent-heat storage tank using this latent-heat storage material composition.

BACKGROUND ART

A latent-heat storage material (or Phase Change Material (PCM)) has a property to store heat utilizing the phenomenon of latent heat absorption and release of latent heat in association with its phase change. Waste heat that would be disposed of ordinarily can be stored in the latent-heat storage material and the stored heat can be released from the latent-heat storage material as required. In this manner, energy can be utilized effectively without waste. In such latent-heat storage material, a supercooling phenomenon that a melt of the latent-heat storage material is not crystallized even when cooled to not more than the freezing point can occur, and a supercooling inhibitor is generally mixed with the latent-heat storage material to prevent the supercooling phenomenon.

The supercooling inhibitor is an additive capable of promoting the induction of crystallization of a latent-heat storage material in a melt state. In addition to the supercooling inhibitor, a melting point modifier can be also mixed with a latent-heat storage material as an additive capable of adjusting the melting point of the latent-heat storage material to an arbitrary temperature as required.

When a latent-heat storage material is a heat storage material whose molecular structure includes a water molecule, for example, like an inorganic salt hydrate or the like, an inorganic salt and water molecules are homogeneously mixed at the start of use. However, while a heat storage and release cycle is repeated several times, phase separation is caused in which the inorganic salt and water are separated. In addition, in a latent-heat storage material composition in which additives such as a supercooling inhibitor and a melting point modifier are added to this latent-heat storage material, while a heat storage and release cycle is repeated several times, the mixed state of components forming the composition becomes inhomogeneous due to a difference in density of the components.

When an additive (a separation inhibitor) capable of avoiding such phase separation and inhomogeneousness of components is added to a latent-heat storage material, such additive acts as a binder for the components included in the latent-heat storage material (or latent-heat storage material composition), and the performance of the latent-heat storage material is easily maintained.

An example of the separation inhibitor is disclosed in Patent Literature 1. Patent Literature 1 discloses a latent-heat storage material composition obtained by adding and mixing a separation inhibitor, which is fine porous or fibrous ceramics and has a particle size of 100 mesh or less, to alum hydrate with a melting point of 94° C., which is a latent-heat storage material, in an amount of 0.1 to 30 wt %.

CITATIONS LIST

Patent Literature

Patent Literature 1: JP 2013-87276 A

SUMMARY OF INVENTION

Technical Problems

In Patent Literature 1, however, it is required to adjust the particle size of a separation inhibitor at the time of producing a latent-heat storage material composition, and also a separation inhibitor itself made from ceramics does not originally have heat storage performance. Therefore, when such separation inhibitor is mixed with alum hydrate in an amount of up to 30 wt %, there is a problem in that the amount of heat storage of the latent-heat storage material composition is considerably reduced compared to the amount of heat storage of a latent-heat storage material alone in the same volume ratio.

In addition, there are cases where it is desired that a latent-heat storage material composition including a separation inhibitor be packed in a vertically long heat storage container such as, for example, a long cylindrical container, and such heat storage containers be housed in a latent-heat storage tank having a heat medium such as water therein in an arrangement in which the axial direction of the heat storage container is arranged along the vertical direction of the tank (vertical arrangement). Particularly in this case, when a latent-heat storage material and a separation inhibitor do not form a stable interaction in a latent-heat storage material composition in a melt state, because of gravity acting on the latent-heat storage material composition in the heat storage container, the components of the latent-heat storage material are separated from each other due to a difference in density of the components (difference in specific gravity), and stable heat storage performance cannot be obtained.

Furthermore, in the case of a latent-heat storage material composition in which a separation inhibitor is added to alum hydrate such as, for example, ammonia alum dodecahydrate ($AlNH_4(SO_4)_2 \cdot 12H_2O$) (hereinafter, can be simply referred to as "ammonia alum") as a latent-heat storage material, because a melt of alum hydrate has acidity, when the added separation inhibitor does not have a property of acid resistance, the latent-heat storage material composition is denatured or deteriorated over time, and desired heat storage performance cannot be stably obtained.

The present invention is made for the purpose of solving the above-mentioned problem, and an object thereof is to provide a latent-heat storage material composition which can keep forming components stable over time and being homogeneously mixed by adding an additive to a latent-heat storage material, and also can obtain a larger amount of heat storage, and a latent-heat storage tank using such latent-heat storage material composition.

Solutions to Problems

A latent-heat storage material composition in one aspect of the present invention, which is made to solve the above-mentioned problem, is a latent-heat storage material composition in which a latent-heat storage material capable of storing heat or releasing heat utilizing the absorption or release of latent heat in association with phase change is mixed with an additive capable of adjusting a property of the latent-heat storage material, wherein the additive is a water-soluble substance belonging to a polysaccharide as a first additive and is a thickener to increase the viscosity of a melt of the latent-heat storage material composition in the state of a liquid phase based on interaction of the thickener with water and a cation included in the latent-heat storage material composition, that the thickener is gellan gum, and that the mixing amount of the gellan gum relative to the whole weight of the latent-heat storage material composition is 1 wt % or less.

According to this aspect, when the latent-heat storage material composition is in a melt state, the viscosity of the latent-heat storage material composition increases. Accordingly, a phase separation phenomenon of the latent-heat storage material can be prevented, and the components of the latent-heat storage material composition can be homogeneously dispersed. In addition to the phase separation phenomenon, also in the case where the latent-heat storage material composition is mixed with other additives such as a melting point modifier and a supercooling inhibitor other than the thickener, the separation of the additives other than the thickener and the latent-heat storage material due to a difference in density of the components can be prevented, and the components of the latent-heat storage material composition can be homogeneously dispersed.

Furthermore, the thickener is gellan gum, and gellan gum itself does not have heat storage performance. However, when gellan gum is contained in a latent-heat storage material composition in an amount of only 1 wt % or less, the viscosity of a melt of the latent-heat storage material composition can be increased to a viscosity sufficient to prevent the separation of the components due to the difference in density. Furthermore, because the components are homogeneously dispersed in the melt of the latent-heat storage material composition and the separation of the components in the latent-heat storage material composition can be more effectively prevented, even when the latent-heat storage material composition repeats phase change between a liquid phase and a solid phase several times, the distribution of the components can be kept homogeneous. Therefore, properties such as the melting point and freezing point of the latent-heat storage material composition can be prevented from varying.

In addition, because the amount of gellan gum is slight, 1.0 wt % or less, even when the latent-heat storage material composition is mixed with a thickener, a reduction in the amount of heat storage can be prevented in the latent-heat storage material composition. The amount of heat storage of a latent-heat storage material composition containing gellan gum has little difference from the amount of heat storage of a latent-heat storage material alone in the same volume ratio, and a high amount of heat storage per volume can be maintained. In particular, when the latent-heat storage material is, for example, ammonia alum dodecahydrate, ammonia alum dodecahydrate has a density of 1.64 g/cm$^3$ and an amount of heat storage per volume of about 250 to 270 kJ/kg, and the amount of heat storage of ammonia alum dodecahydrate is great among various latent-heat storage materials. Therefore, a latent-heat storage material composition in which gellan gum is added to ammonia alum dodecahydrate provided as an example can also have a relatively great amount of heat storage, for example, above 220 kJ/kg.

Furthermore, because the thickener is gellan gum, which has a property of acid resistance, for example, even when a melt of ammonia alum dodecahydrate, potassium alum dodecahydrate, or the like has a property of acidity, the latent-heat storage material composition is not denatured or modified over time due to the addition of the gellan gum.

In addition, a latent-heat storage material composition in another aspect of the present invention, which is made to solve the above-mentioned problem, is a latent-heat storage material composition in which a latent-heat storage material capable of storing heat or releasing heat utilizing the absorption or release of latent heat in association with phase change is mixed with an additive capable of adjusting a property of the latent-heat storage material, wherein the latent-heat storage material composition is used by repeating a heat storage and release cycle several times by phase change between a liquid phase and a solid phase with the latent-heat storage material composition packed in a container, the additive is a water-soluble substance belonging to a polysaccharide as a first additive and is a thickener to increase the viscosity of a melt of the latent-heat storage material composition in the state of a liquid phase based on interaction of the thickener with water and a cation included in the latent-heat storage material composition, the thickener is dissolved in water included in the latent-heat storage material composition to have a random coil structure when the latent-heat storage material composition is in a temperature range of the state of a liquid phase, while, when the latent-heat storage material composition is in a temperature range before changing from the state of a liquid phase to the state of a complete solid phase, the structure of the thickener changes into a double spiral structure reversible from the random coil structure and also the thickener has a property to cause gelation by the assembly of the double spiral structures next to each other based on the presence of the cation, the mixing amount of the thickener relative to the whole weight of the latent-heat storage material composition is 1 wt % or less, and the latent-heat storage material composition is formed in a state in which the separation of the components of the latent-heat storage material composition due to a difference in density is prevented by the thickener.

According to this aspect, when the latent-heat storage material composition is in a melt state, the viscosity of the latent-heat storage material composition increases. Accordingly, a phase separation phenomenon of the latent-heat storage material can be prevented, and the components of the latent-heat storage material composition can be homogeneously dispersed. In addition to the phase separation phenomenon, also in the case where the latent-heat storage material composition is mixed with other additives such as a melting point modifier and a supercooling inhibitor other than the thickener, the separation of the additives other than the thickener and the latent-heat storage material due to a difference in density of the components can be prevented, and the components of the latent-heat storage material composition can be homogeneously dispersed.

Furthermore, when the thickener is water-soluble gellan gum or the like belonging to one type of polysaccharide classified into, for example, hetero polysaccharide, the thickener itself, such as gellan gum, does not have heat storage performance; however, when such a thickener is contained in the latent-heat storage material composition in an amount of only 1 wt % or less, a melt of the latent-heat storage material composition has a viscosity sufficient to prevent the separation of the components due to a difference in density by its gelation.

Furthermore, because the components are homogeneously dispersed in a melt of the latent-heat storage material composition and the separation of the components in the latent-heat storage material composition can be more effectively prevented, even when the latent-heat storage material composition repeats phase change between a liquid phase and a solid phase several times, the distribution of the components can be kept homogeneous. Therefore, properties such as the melting point and freezing point of the latent-heat storage material composition can be prevented from varying.

In addition, because the amount of thickener is slight, 1.0 wt % or less, even when the latent-heat storage material composition is mixed with a thickener, a reduction in the amount of heat storage can be prevented in the latent-heat storage material composition. The amount of heat storage of the latent-heat storage material composition has little difference from the amount of heat storage of a latent-heat storage material alone in the same volume ratio, and the latent-heat storage material composition can maintain a higher amount of heat storage.

In the above-mentioned aspect, the main component of the latent-heat storage material is preferably alum hydrate.

According to this aspect, a latent-heat storage material having alum hydrate such as ammonia alum dodecahydrate, for example, has a property of relatively large latent heat in association with phase change. Because of this, the amount of heat that can be stored in a latent-heat storage material with such a property is relatively large. Therefore, the latent-heat storage material composition including a latent-heat storage material, alum hydrate, is excellent because the latent-heat storage material composition has heat storage-release performance to store a large capacity of heat and release a large capacity of the heat.

In the above-mentioned aspect, the alum hydrate is preferably either ammonia alum dodecahydrate ($AlNH_4(SO_4)_2 \cdot 12H_2O$) or potassium alum dodecahydrate ($AlK(SO_4)_2 \cdot 12H_2O$).

According to this aspect, ammonia alum dodecahydrate and potassium alum dodecahydrate are widely distributed in the market, and are therefore easily commercially available and inexpensive.

In the above-mentioned aspect, the cation is preferably a positive ion constituting the alum hydrate.

According to this aspect, alum hydrate is a supply source for the cation, and accordingly it is not required to add another additive separately from a thickener to promote gelation of the thickener and to improve the strength of gel texture of the thickener.

In the above-mentioned aspect, a second additive, which is another additive different from the first additive, is mixed, and the second additive is a melting point modifier that can adjust the melting point of a latent-heat storage material and is preferably a substance having a property to generate negative dissolution heat upon being dissolved in the latent-heat storage material.

According to this aspect, water which dissolves a melting point modifier is included in the structure of the latent-heat storage material composition, and accordingly in the latent-heat storage material composition which contains a latent-heat storage material as the main component, the amount of heat storage that can be stored in the latent-heat storage material component can also be increased because the amount of heat storage is the sum total of relatively large latent heat of fusion and negative dissolution heat.

In the latent-heat storage material composition according to the present invention, the "substance having a property to generate negative dissolution heat" corresponds to a "substance belonging to a sugar alcohol" such as erythritol ($C_4H_{10}O_4$), xylitol ($C_5H_{12}O_5$), mannitol ($C_6H_{14}O_6$), sorbitol ($C_6H_{14}O_6$), and lactitol ($C_{12}H_{24}O_{11}$), also corresponds to a "substance belonging to a chloride" such as calcium chloride hexahydrate ($CaCl_2 \cdot 6H_2O$), magnesium chloride hexahydrate ($MgCl_2 \cdot 6H_2O$), potassium chloride (KCl), and sodium chloride (NaCl), and moreover corresponds to a "substance belonging to a sulfate salt" such as ammonium sulfate (($NH_4)_2SO_4$).

In addition, the "substance having a property to generate negative dissolution heat" may include at least one of the substances corresponding to the above-described "substance belonging to a sugar alcohol" or may include at least one of the substances corresponding to the above-described "substance belonging to a chloride" or may include at least one of the substances corresponding to the above-described "substance belonging to a sulfate salt." In addition, a mixture of any one of the substances corresponding to the above-described "substance belonging to a sugar alcohol" with any one of the substances corresponding to the above-described "substance belonging to a chloride" is also included. In addition, a mixture of any one of the substances corresponding to the above-described "substance belonging to a sugar alcohol" with any one of the substances corresponding to the above-described "substance belonging to a sulfate salt" is also included.

Furthermore, a mixture of any one of the substances corresponding to the above-described "substance belonging to a sugar alcohol," any one of the substances corresponding to the above-described "substance belonging to a chloride" and any one of the substances corresponding to the above-described "substance belonging to a sulfate salt" is also included (in which a case where a mixed crystal is composed of a chloride and a sulfate salt may also be included).

Namely, when the latent-heat storage material contained in the latent-heat storage material composition according to the present invention includes, for example, an inorganic salt hydrate, a substance which can absorb heat from the outside to cause an endothermic heat reaction when dissolved in hydration water in the inorganic salt hydrate (for example, in addition to the case where the substance is dissolved in hydration water in the inorganic salt hydrate, including the case where, when the inorganic salt hydrate contains, in the structure thereof, a molecule which is different from hydration water and capable of acting as a solvent, the substance is dissolved in a constitutive substance other than hydration water) is defined as the "substance having a property to generate negative dissolution heat" in the latent-heat storage material composition according to the present invention.

In the above-mentioned aspect, in a latent-heat storage tank equipped with a latent-heat storage material composition in which a latent-heat storage material capable of storing heat or releasing heat utilizing the absorption or release of latent heat in association with phase change is mixed with an additive capable of adjusting a property of the latent-heat storage material, a heat medium which is a medium to transfer heat from/to the latent-heat storage material composition, and a dividing member to divide the latent-heat storage material composition and the heat medium in the inner part thereof, the latent-heat storage material composition is preferably any one of the foregoing latent-heat storage material compositions.

According to this aspect, even when the latent-heat storage material composition repeats a heat storage and release cycle several times, the separation of the components of the latent-heat storage material composition due to a difference in density is prevented. Therefore, the latent-heat storage material composition can stably maintain the initial state of its heat storage performance for a long period of time, not only in the case where vertically long dividing members packed with the latent-heat storage material composition are housed in a latent-heat storage tank in vertical arrangement, for example, like a latent-heat storage tank shown in FIG. 13, but also in the case where bag-shaped heat storage material packaging containers packed with the latent-heat storage material composition are arranged in a longitudinal direction and housed in a latent-heat storage tank.

Advantageous Effects of Invention

The latent-heat storage material composition according to the present invention has excellent effects such that even when a latent-heat storage material is mixed with an additive, the forming components are kept stable over time and homogeneously mixed and a larger amount of heat storage can be achieved.

BRIEF DESCRIPTION OF DRAWINGS

FIG. 8 is a table relating to the latent-heat storage material composition according to Example, showing the experiment conditions employed in Experiments 1 and 2 according to Example and Comparative Example and the measurement results of the melting point and amount of heat storage measured by DSC together;

DESCRIPTION OF EMBODIMENT (Embodiment)

Figure 13:
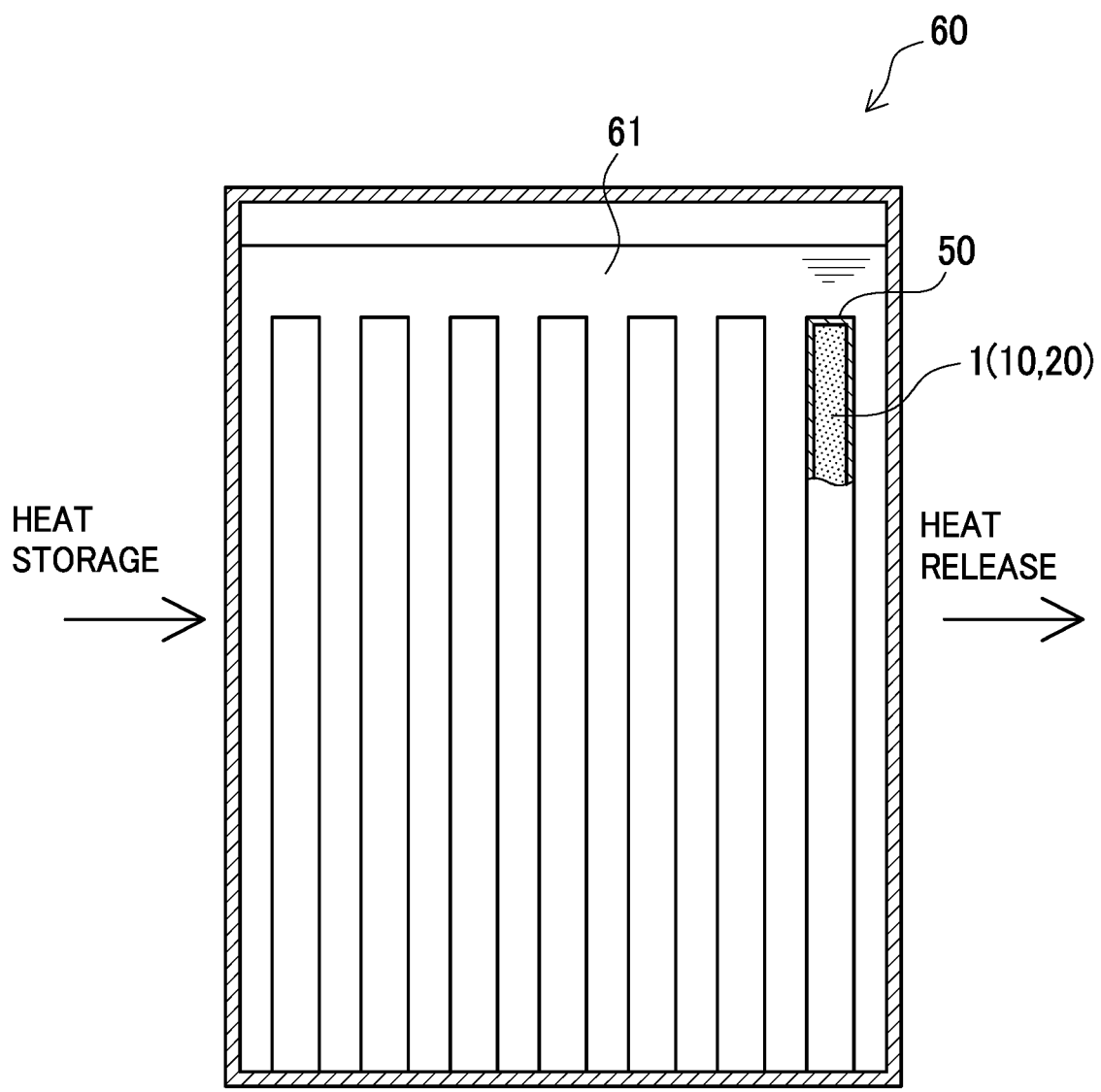
FIG. 13 is a schematic diagram providing a heat storage tank according to the present embodiment as an example.

An embodiment of a latent-heat storage material composition and a latent-heat storage tank using this latent-heat storage material composition according to the present invention will now be described in detail based on the drawings. FIG. 13 is a schematic diagram which provides a heat storage tank according to the present embodiment as an example.

A latent-heat storage tank 60, for example, is installed between a heat supply source, such as a cogeneration (or Combined Heat and Power) gas engine system used to generate electricity for hospitals and buildings, and equipment to which heat is supplied and which uses heat energy in waste heat generated in this heat supply source. A latent-heat storage material composition 1 is packed in a heat storage material packaging container 50 (corresponding to a dividing member according to the present invention) in the present embodiment, and a plurality of the heat storage material packaging containers 50 are housed in a heat medium 61 such as water stored in the latent-heat storage tank 60.

In the latent-heat storage tank 60, the heat medium 61 is heated to about 90° C. by waste heat from the heat supply source, and a latent-heat storage material 10 in the latent-heat storage material composition 1 stores heat in a temperature range from 80° C. to 90° C. through the heat medium 61 and the heat storage material packaging container 50. The heat stored in the latent-heat storage material composition 1 is released at a temperature in the temperature range, and is utilized as heat energy for equipment to which heat is supplied such as hot water supply equipment or air conditioning equipment for heating and cooling, for example.

Figure 1:
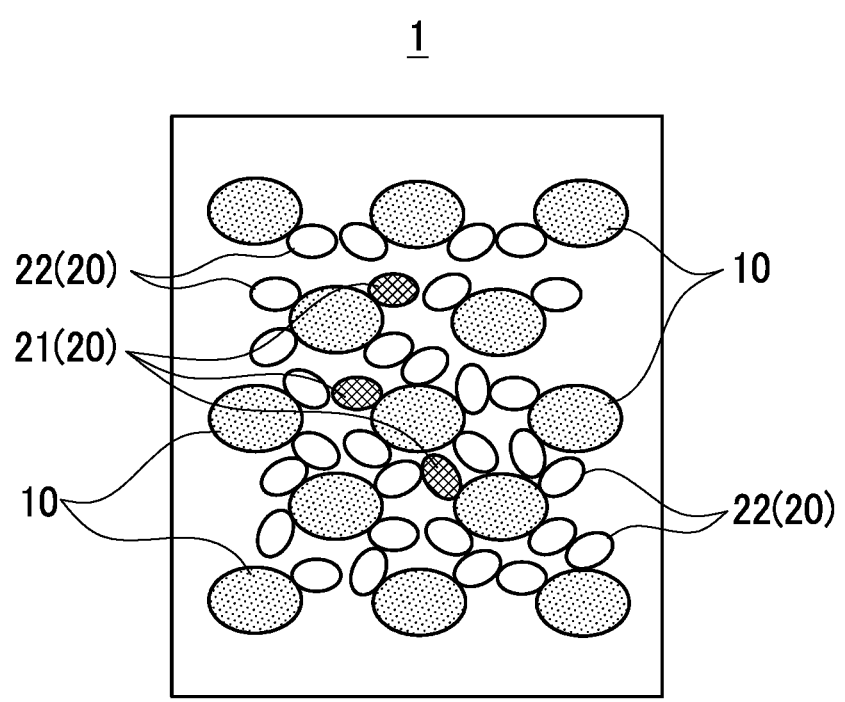
FIG. 1 is an explanatory diagram schematically showing a latent-heat storage material composition according to an embodiment.

Next, the latent-heat storage material composition 1 will be described using FIG. 1. FIG. 1 is an explanatory diagram which schematically shows the latent-heat storage material composition according to the embodiment. As shown in FIG. 1, the latent-heat storage material composition 1 is formed by mixing the latent-heat storage material 10 with two additives 20. The latent-heat storage material 10 is a latent-heat storage material capable of storing heat or releasing heat through the absorption or release of latent heat in association with phase change.

The latent-heat storage material 10 is a heat storage material having alum hydrate as the main component, and is ammonia alum dodecahydrate (ammonium aluminum sulfate dodecahydrate: $AlNH_4(SO_4)_2 \cdot 12H_2O$) (hereinafter, can be simply referred to as "ammonia alum") in the present embodiment. Ammonia alum has properties of a melting point of 93.5° C. and acidity (in the case of a 1% aqueous solution, pH is about 3.6), and is a solid substance at ambient temperature. Therefore, even when ammonia alum alone is heated to about 90° C. that is lower than the melting point thereof, ammonia alum is hardly melted and cannot store latent heat.

In addition, the latent-heat storage material 10, which is the main component of the latent-heat storage material composition 1, is ammonia alum dodecahydrate (ammonium aluminum sulfate dodecahydrate: $AlNH_4(SO_4)_2 \cdot 12H_2O$) in the present embodiment.

However, the latent-heat storage material includes an inorganic salt hydrate, and may be "alum hydrate" which is a double sulfate salt of a monovalent cation sulfate salt $M^I{}_2(SO_4)$ and a trivalent cation sulfate salt $M^{III}{}_2(SO_4)_3$ such as potassium alum dodecahydrate ($AlK(SO_4)_2 \cdot 12H_2O$), chromium alum dodecahydrate ($CrK(SO_4)_2 \cdot 12H_2O$), iron alum dodecahydrate ($FeNH_4(SO_4)_2 \cdot 12H_2O$) besides ammonia alum dodecahydrate.

In addition, the trivalent metal ion contained in this "alum hydrate" may be an aluminum ion, a chromium ion or an iron ion, or may be a metal ion such as a cobalt ion or a manganese ion. Furthermore, the latent-heat storage material 10 may be a heat storage material which contains, as the main component, a mixture or mixed crystal of at least two substances each belonging to this alum hydrate.

Two types of additive 20 (first additive, second additive) that both are water-soluble additives with a function to adjust a property of the latent-heat storage material 10. The first additive 20 is a thickener 21 to increase the viscosity of a melt of the latent-heat storage material composition 1 in the state of a liquid phase. The second additive 20 is a melting point modifier 22 to adjust the melting point of the latent-heat storage material 10 to an arbitrary temperature as required, and the melting point modifier 22 includes a substance having a property to generate negative dissolution heat upon being dissolved in the latent-heat storage material 10.

In addition, the thickener 21 and the melting point modifier 22 are provided as the additives 20 mixed with the latent-heat storage material composition 1 in the present embodiment; however, additives other than the thickener 21 mixed with the latent-heat storage material composition are not limited to the melting point modifier 22. Examples thereof can include a supercooling inhibitor to promote the induction of the crystallization of a heat storage material in a melt state, and a colorant to color the latent-heat storage material composition, and the like.

Firstly, the definition of the "substance having a property to generate negative dissolution heat" will be described and then the melting point modifier 22 will be described. As described above, the latent-heat storage material composition 1 is obtained by mixing the latent-heat storage material 10 including ammonia alum dodecahydrate (ammonium aluminum sulfate dodecahydrate), which is the main component, with the thickener 21 and the melting point modifier 22. When the melting point modifier 22 is dissolved in hydration water of the latent-heat storage material 10, if an endothermic heat reaction occurs in this melting point modifier 22 as the result of absorption of heat from the outside, the melting point modifier 22 is defined as the "substance having a property to generate negative dissolution heat" in the latent-heat storage material composition 1 according to the present embodiment.

In addition to erythritol and xylitol, the "substance having a property to generate negative dissolution heat" includes, for example, a "substance belonging to a sugar alcohol" such as mannitol ($C_6H_{14}O_6$), sorbitol ($C_6H_{14}O_6$) or lactitol ($C_{12}H_{24}O_{11}$). In addition, a "substance belonging to a chloride" such as calcium chloride hexahydrate ($CaCl_2 \cdot 6H_2O$), magnesium chloride hexahydrate ($MgCl_2 \cdot 6H_2O$), potassium chloride (KCl), or sodium chloride (NaCl) is included. Furthermore, a "substance belonging to a sulfate salt" such as ammonium sulfate (($NH_4)_2SO_4$) is included.

In addition, the "substance having a property to generate negative dissolution heat" may include at least one of the substances corresponding to the above-described "substance belonging to a sugar alcohol" or may include at least one of the substances corresponding to the above-described "substance belonging to a chloride" or may include at least one of the substances corresponding to the above-described "substance belonging to a sulfate salt." In addition, a mixture of any one of the substances corresponding to the above-described "substance belonging to a sugar alcohol" with any one of the substances corresponding to the above-described "substance belonging to a chloride" is also included. In addition, a mixture of any one of the substances corresponding to the above-described "substance belonging to a sugar alcohol" with any one of the substances corresponding to the above-described "substance belonging to a sulfate salt" is also included.

Furthermore, a mixture of any one of the substances corresponding to the above-described "substance belonging to a sugar alcohol," any one of the substances corresponding to the above-described "substance belonging to a chloride" and any one of the substances corresponding to the above-described "substance belonging to a sulfate salt" is also included (in which a case where a mixed crystal is composed of a chloride and a sulfate salt may also be included).

In addition, for example, ammonium nitrate, potassium chlorate or the like, which is required to be handled carefully and is not preferably used in the latent-heat storage material composition in the present embodiment, also corresponds to the "substance having a property to generate negative dissolution heat," because the substance can cause an endothermic heat reaction upon being dissolved in water.

The melting point modifier 22 will be described in detail. The melting point modifier 22 is mannitol ($C_6H_{14}O_6$) in the present embodiment, and the mixing amount of mannitol ($C_6H_{14}O_6$) relative to the whole weight of the latent-heat storage material composition 1 is 10 wt % or less. When mannitol is added to ammonia alum (latent-heat storage material 10), for example, in a mixing amount of 8 wt % relative to the whole weight of the latent-heat storage material composition 1, the melting point of the latent-heat storage material composition 1 is about 90° C.

Next, the thickener 21 will be described. The thickener 21 is a water-soluble substance belonging to a polysaccharide, a substance to increase the viscosity of a melt of the latent-heat storage material composition 1 in the state of a liquid phase based on interaction of the thickener with water and a cation included in the latent-heat storage material composition 1, and a water-soluble substance with properties equivalent to gellan gum belonging to one type of polysaccharide classified into hetero polysaccharide.

This substance with properties equivalent to gellan gum will be conceptually described here, and a detailed description by way of specific exemplification will be given below. Examples of the substance with properties equivalent to gellan gum include gellan gum and also a substance equivalent to gellan gum, which has properties equivalent to the properties of gellan gum. Gellan gum is a polymer compound based on a polymer in which monosaccharides are linked linearly as shown in the following chemical structure.

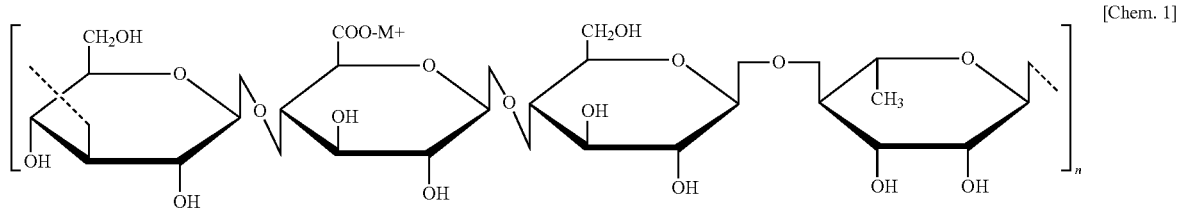

[Chem. 1]

The monomers, which are substrates of the polymer, include 4 sugar molecules of three types in total, two D-glucose residues, one D-glucuronic acid residue, and one L-rhamnose residue. Gellan gum is a polymer compound with a large molecular weight and has water solubility. The reason is that gellan gum has the carboxy group (which is shown as "COOH" in the chemical structure), a monovalent functional group on the D-glucuronic acid residue.

That is, a part of the carboxy group releases a proton ("H+" in the chemical structure) in water. Gellan gum molecules have a negative electric charge (shown as "COO−" in the chemical structure) and thus electrostatically repel each other to disperse in water, and accordingly gellan gum shows water solubility. Gellan gum dispersed in water has a random coil structure under high temperature, but forms a double spiral structure when being cooled. When a cation is supplied from the outside to gellan gum in such state, these double spiral structures are assembled to each other, and gellan gum to which the cation has been supplied gels due to this association.

EXAMPLE

Figure 2:
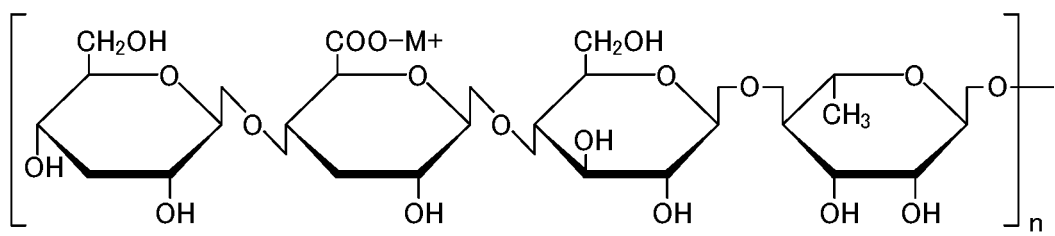
FIG. 2 is a diagram showing the chemical structure of a thickener used for the latent-heat storage material composition according to Example of the embodiment.
Figure 4:
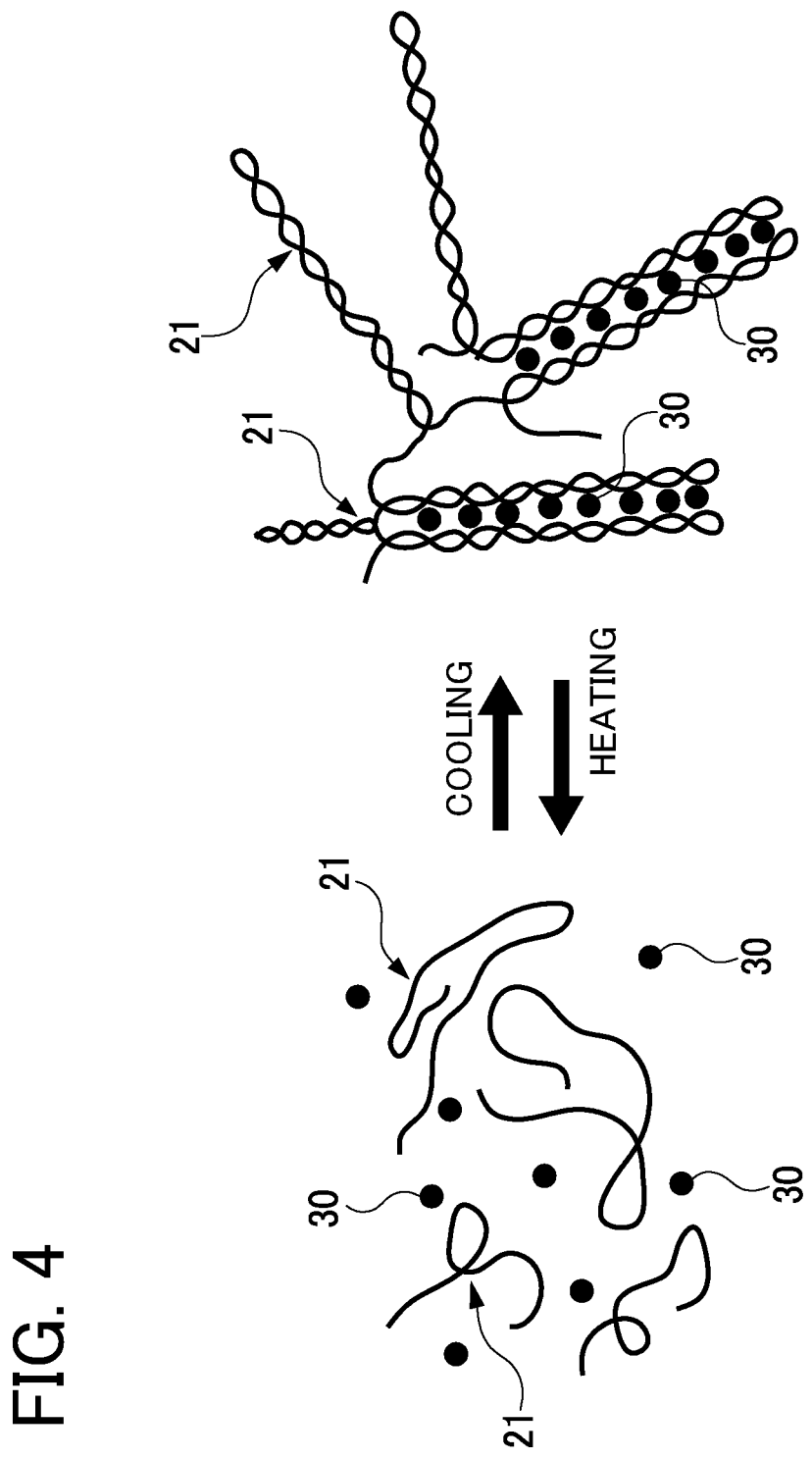
FIG. 4 is a schematic diagram illustrating the act of the thickener according to the embodiment.

Example will be described in detail. FIG. 2 is a diagram showing the chemical structure of a thickener used for the latent-heat storage material composition according to Example of the embodiment, and FIG. 4 is a schematic diagram which illustrates the act of a thickener according to the embodiment. The thickener 21 is LA gellan gum (low acyl gellan gum), one type of gellan gum (another name: gellan, polysaccharide S-60), in Example of the present embodiment. The mixing amount of LA gellan gum relative to the whole weight of the latent-heat storage material composition 1 is 1 wt % or less.

As shown in FIG. 2, LA gellan gum 21 (thickener 21) is a polymer compound based on a polymer in which monosaccharides are linked linearly and belongs to a polysaccharide. The monomers, which are substrates of the polymer, include 4 sugar molecules of three types in total, two D-glucose residues, one D-glucuronic acid residue, and one L-rhamnose residue. The LA gellan gum 21 is in the form of crystalline powder under ambient temperature, and the LA gellan gum 21 is dissolved in water at a temperature of about 85° C. or higher and dispersed.

When the LA gellan gum 21 dispersed in water is cooled to lower than about 85° C., the random coil structure changes to the double spiral structure. Furthermore, when a cation is supplied from the outside to gellan gum having such double spiral structure, the LA gellan gum 21 forms a network structure in which the double spiral structures are assembled in an acid/neutral liquid to form gel with high transparency.

That is, as shown in FIG. 2, when a cation 30 is supplied to the LA gellan gum 21 from the outside, an electrostatic interaction in which the carboxy group (shown as "COO−" in the chemical structure shown in FIG. 2), a functional group having a negative electric charge, and the cation 30 (positive ion) (similarly shown as "M+") having a positive electric charge are attracted to each other occurs in the D-glucuronic acid residue of the LA gellan gum 21. At this time, in the case where the cation 30 is monovalent, the positive electric charge of the cation 30 and the negative electric charge on the carboxy group in the LA gellan gum 21 offset each other, and electrostatic repulsion of the LA gellan gum 21 forming a double spiral structure disappears.

Furthermore, these double spiral structures are assembled by hydrogen bonds which act mutually between oxygen atoms and hydrogen atoms included in the double spiral structure as shown in FIG. 4. In addition, in the case where the cation 30 is divalent, the carboxy groups ("COO−" in FIG. 2) having a negative electric charge included in double spiral structures are cross-linked through electrostatic interaction with the cation 30 ("M2+") having a positive electric charge, and these double spiral structures are assembled with each other. The LA gellan gum 21 to which the cation 30 has been supplied gels by this association.

The substance with properties equivalent to gellan gum is a substance equivalent to such LA gellan gum 21. When a polymer compound, which is formed by linking a plurality of sugar molecules regardless of whether one type or plural types, has a hydrophilic group such as a carboxy group in the forming sugar molecules, the polymer compound has water solubility and a functional group which is dissociated in water to have a negative electric charge. A substance which can form an electrostatic interaction between a cation supplied from the outside and this functional group in the coexistence of water corresponds to the substance with properties equivalent to gellan gum. In addition, as properties equivalent to the properties of the LA gellan gum 21, there are provided characteristics that there are water solubility and a nature to form a three-dimensional structure such as at least a spiral structure by the interaction between functional groups in a molecule, and these spiral structures are assembled by the electrostatic interaction between a cation supplied from the outside and a functional group in the coexistence of water to form a network structure to promote gelation. In the latent-heat storage material composition 1 according to the present embodiment, the LA gellan gum 21 and also a substance having such characteristics are defined as the "substance with properties equivalent to gellan gum."

Modified Example

Figure 3:
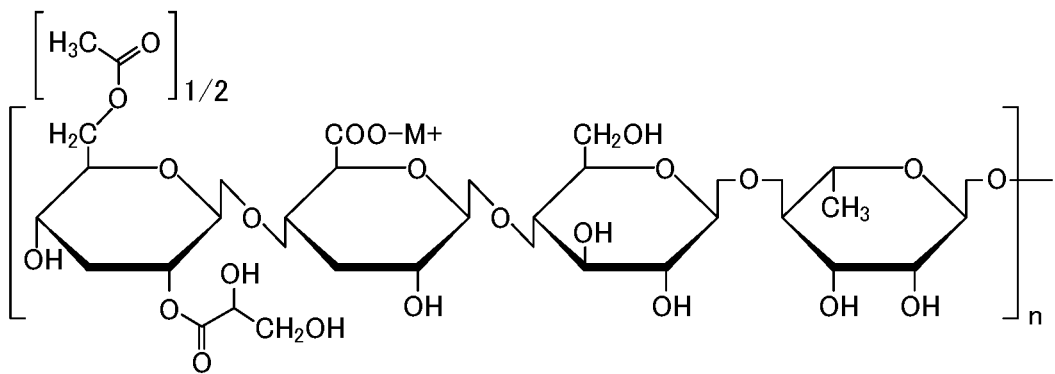
FIG. 3 is a diagram showing the chemical structure of a thickener according to Modified Example of the embodiment.

In addition to the LA gellan gum 21, the thickener 21 may be HA gellan gum 21A as shown in FIG. 3 as an example of the substance with properties equivalent to gellan gum. FIG. 3 is a diagram showing the chemical structure of a thickener used for a latent-heat storage material composition according to a modified mode. As shown in FIG. 3, the HA gellan gum 21A (high acyl gellan gum) is one type of gellan gum, and has a structure in which the hydrogen atoms ("H") of two hydroxy groups ("OH") in one D-glucose residue of two D-glucose residues in the LA gellan gum 21 are substituted with other substituents. In the case of the HA gellan gum 21A, when the HA gellan gum 21A is heated to about 90° C. or higher, the HA gellan gum 21A is dissolved and dispersed in water.

In addition, when the HA gellan gum 21A dispersed in water is cooled to lower than about 90° C. to gel, it is not essential that a cation exists to promote gelation. However, when a cation exists at a high concentration in a certain range, the strength of the gel texture increases.

Figure 5:
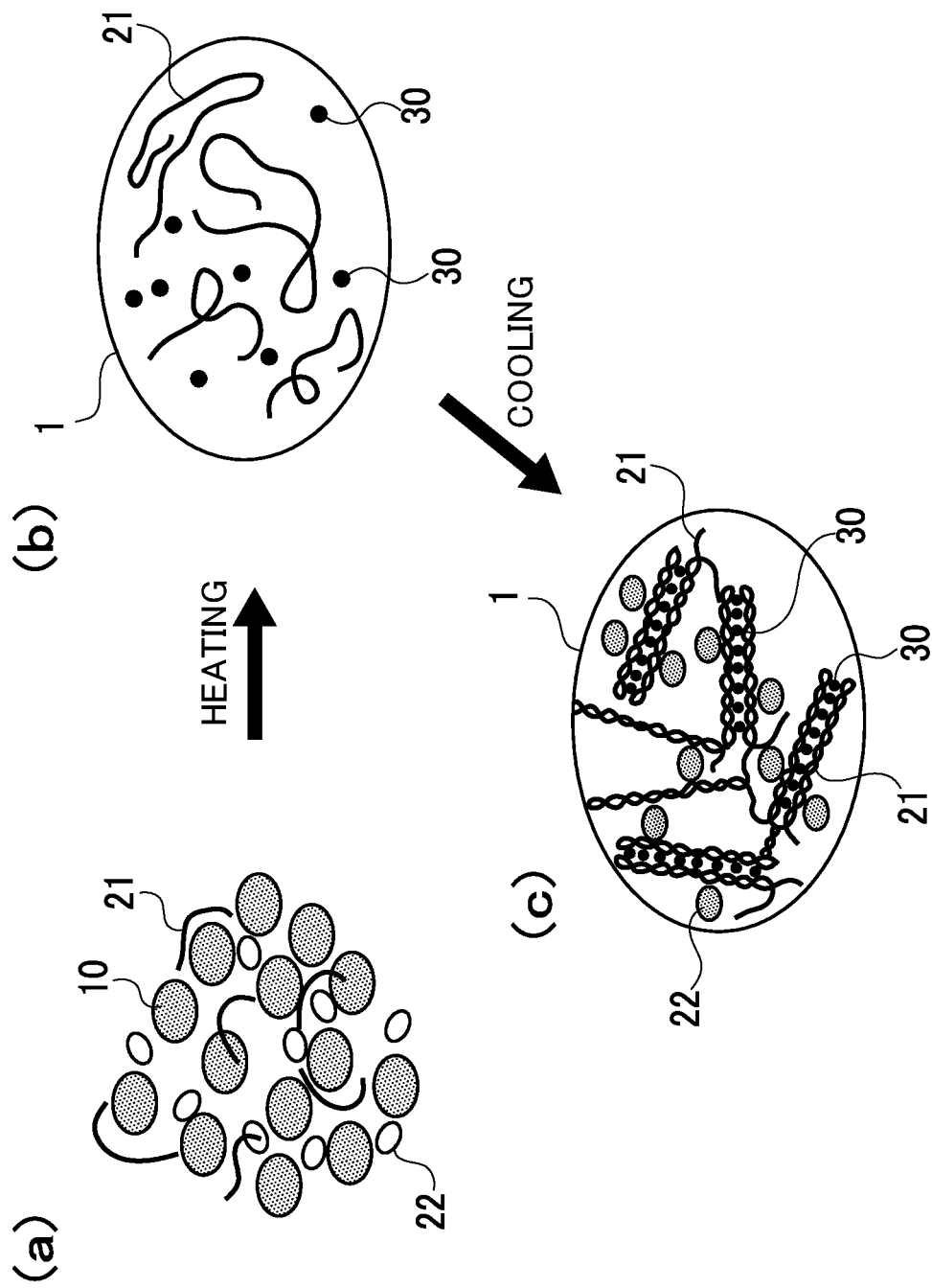
FIG. 5 is an explanatory diagram schematically showing changes in mechanisms of the state of the latent-heat storage material composition according to the embodiment by the thickener.

FIG. 5 is an explanatory diagram schematically showing changes in mechanisms of the state of the latent-heat storage material composition according to the embodiment by a thickener. The latent-heat storage material composition 1 includes a latent-heat storage material 10 having ammonia alum dodecahydrate (ammonium aluminum sulfate dodecahydrate: $AlNH_4(SO_4)_2 \cdot 12H_2O$) as the main component, a thickener 21, and a melting point modifier 22.

As shown in FIG. 5, after the latent-heat storage material 10, the thickener 21, and the melting point modifier 22 are prepared in predetermined proportions (FIG. 5(a)), the latent-heat storage material 10, the thickener 21, and the melting point modifier 22 are heated to above about 90° C., which is the melting point of the latent-heat storage material composition 1, to form a melt of the latent-heat storage material composition 1 (FIG. 5(b)). In the melt of the latent-heat storage material composition 1, the LA gellan gum 21 is dissolved in water (hydration water) contained in the latent-heat storage material 10 (ammonia alum dodecahydrate) and dispersed in water.

When this melt of the latent-heat storage material composition 1 is cooled to a temperature slightly lower than a melting point of about 90° C. (a temperature range of 80 to 90° C. used in the latent-heat storage tank 60), the crystals of the latent-heat storage material 10 start to be gradually generated due to phase change of the latent-heat storage material 10 occurring in the melt of the latent-heat storage material composition 1 (FIG. 5(c)). On the other hand, the latent-heat storage material 10 is included in the melt of the latent-heat storage material composition 1, and a monovalent cation "$NH_4^+$" exists in ammonium aluminum sulfate ($AlNH_4(SO_4)_2$) forming the latent-heat storage material 10. This "$NH_4^+$" functions as a cation 30 to promote gelation of the LA gellan gum 21.

That is, as shown in FIG. 5(c), when the LA gellan gum 21 is cooled to a temperature slightly lower than a melting point of about 90° C. of the latent-heat storage material composition 1 (a temperature range of 80 to 90° C. used in the latent-heat storage tank 60) in the melt of the latent-heat storage material composition 1, the structure changes from a random coil form (see FIG. 5(b)) to a double spiral structure. Furthermore, these double spiral structures are assembled with each other by hydrogen bonds which mutually act between oxygen atoms and hydrogen atoms due to the existence of "$NH_4^+$" in the LA gellan gum 21.

Therefore, the LA gellan gum 21 in the melt of the latent-heat storage material composition 1 forms gel due to the existence of "$NH_4^+$" supplied from the latent-heat storage material 10. The viscosity of the whole melt of the latent-heat storage material composition 1 further increases due to gelation of the LA gellan gum 21.

Because a thickener 21 (LA gellan gum 21) is added to the latent-heat storage material composition 1, components, which are ammonium aluminum sulfate and hydration water forming the latent-heat storage material 10 and mannitol used as the melting point modifier 22, are not separated from each other and can be homogeneously dispersed under the action of the gelled LA gellan gum 21.

In the meantime, when such latent-heat storage material composition 1 is actually used in the latent-heat storage tank 60, there is a case where it is desired that the latent-heat storage material composition 1 be packed in vertically long heat storage material packaging containers 50 as shown in FIG. 13, the longitudinal direction of the heat storage material packaging containers 50 (vertical direction in FIG. 13) be arranged along the vertical direction of the latent-heat storage tank 60 (vertical arrangement), and the heat storage material packaging containers 50 be immersed and housed in the heat medium 61 in the latent-heat storage tank 60. Because the thickener 21 (LA gellan gum 21) is added to the latent-heat storage material composition 1, the components forming a melt of the latent-heat storage material composition 1 are not separated from each other and are homogeneously dispersed.

Therefore, even when the heat storage material packaging containers 50 packed with the latent-heat storage material composition 1 are housed in vertical arrangement, the separation of the components in the latent-heat storage material composition 1 due to a difference in density (difference in specific gravity) of the components can be prevented by the gelled LA gellan gum 21. In particular, when comparing the latent-heat storage material composition 1 between the upper portion and the lower portion of one heat storage material packaging container 50 packed with the latent-heat storage material composition 1, a large variation in heat storage performance about the amount of heat storage capable of storing heat and the heat release amount of the heat between both the portions does not easily occur.

Next, for the purpose of testing the effect of a thickener in the latent-heat storage material composition, Experiments 1 and 2 for comparing the latent-heat storage material composition 1 according to Example and a latent-heat storage material composition 100 according to Comparative Example were carried out. In Experiment 1, using samples of the latent-heat storage material composition 1, to which LA gellan gum 21, a thickener, had been added, each sampled from the upper and lower portions, a relationship between the position of a site from which a sample of the latent-heat storage material composition 1 was sampled, and the heat storage performance of the latent-heat storage material 10 was examined.

Similarly, in Experiment 2, using samples of the latent-heat storage material composition 100, to which LA gellan gum 21 had not been added, each sampled from the upper and lower portions, a relationship between the position of a site from which a sample of the latent-heat storage material composition 100 was sampled, and the heat storage performance of the latent-heat storage material 10 was examined. The present applicant verified the significance of the latent-heat storage material composition 1 including LA gellan gum 21 by Experiments 1 and 2.

Figure 6:
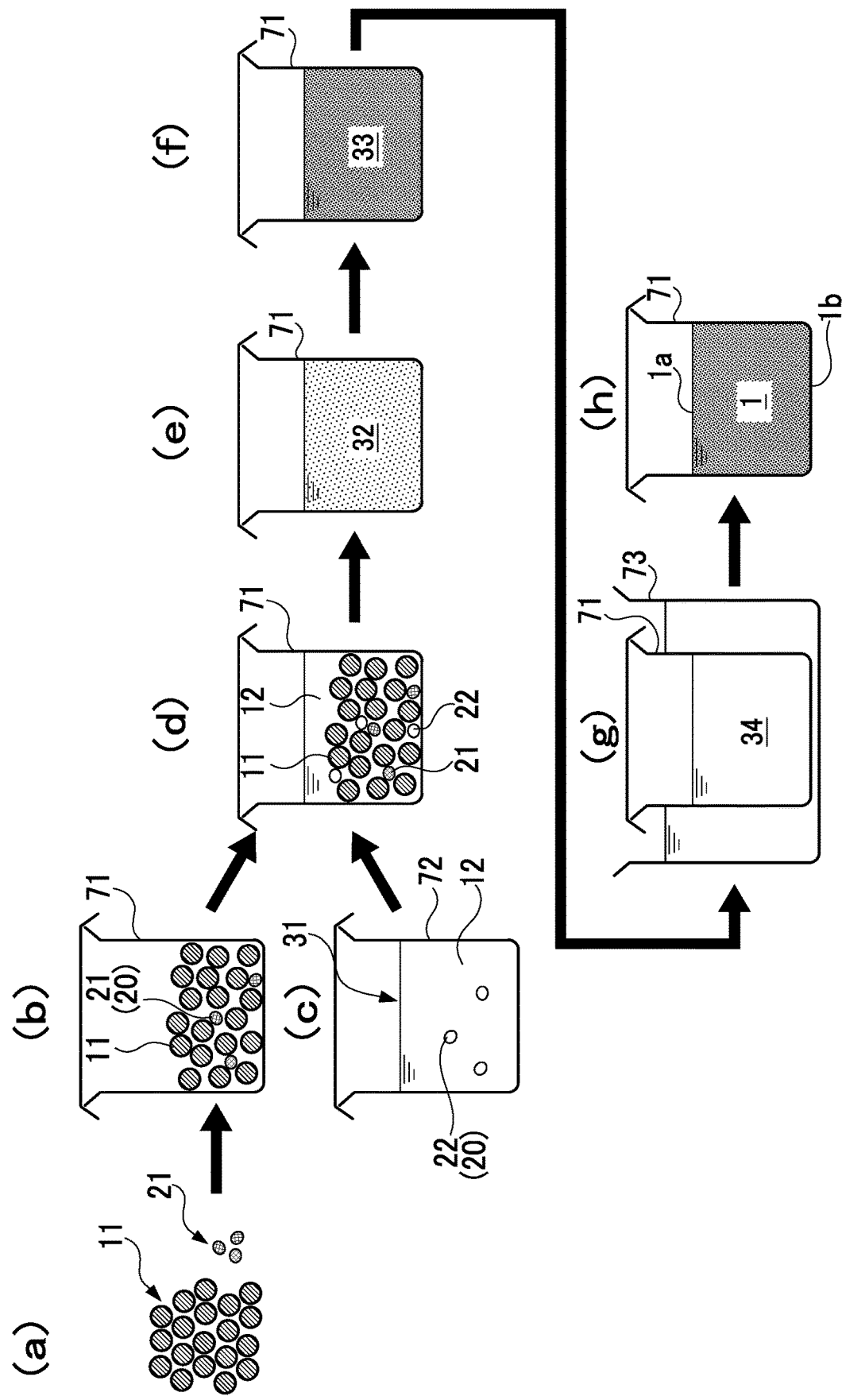
FIG. 6 is a flow diagram showing a production procedure for a latent-heat storage material composition, which is an original sample used in Experiment 1.

Firstly, a production procedure for the latent-heat storage material composition 1, which is an original sample used in Experiment 1, will be described using FIG. 6. FIG. 6 is a flow diagram showing the production procedure for the latent-heat storage material composition, which is an original sample used for the experiments. In Experiment 1, in a latent-heat storage material composition 1 used as a sample, ammonium alum anhydrate (ammonia alum anhydrate 11) was used for preparing the latent-heat storage material 10 (ammonia alum dodecahydrate).

Powder of ammonia alum anhydrate 11, 96.34 g, and powder of LA gellan gum 21, 2.00 g, were each weighed (FIG. 6(a)). Ammonia alum anhydrate 11 is in a powder state obtained by pulverizing particles to an average size of about 1 mm. After weighing them, these ammonia alum anhydrate 11 and LA gellan gum 21 were added to a 250 ml first container 71 made from polypropylene (PP) (FIG. 6(b)). This first container 71 and a second container 72 described below are containers equipped with a cover to close the container to prevent a liquid such as water in the container from leaking outside the container due to vaporization by heating.

In the meantime, 87.66 g of water 12 was weighed and added to the second container 72 made from polypropylene different from the first container 71. The water 12 is, for example, pure water, ion-exchange water, tap water, or the like. The amount of the water 12 is the same as the amount of water added to ammonia alum anhydrate 11 which is required to generate ammonia alum dodecahydrate (latent-heat storage material 10), a hydrate thereof.

That is to say, this amount of water added is an amount corresponding to the hydration water ($12H_2O$) included in ammonia alum dodecahydrate. Subsequently, 16.00 g of a melting point modifier 22 (mannitol 22) was weighed. The mannitol 22 is a melting point modifier having negative dissolution heat as mentioned above. After weighing it, the mannitol 22 was added to the second container 72 including the water 12, and the obtained mixture was stirred to prepare a mannitol aqueous solution 31 in which the mannitol 22 was dissolved in the water 12 (FIG. 6 (C)).

Next, the mannitol aqueous solution 31 in the second container 72 was poured into the first container 71 including ammonia alum anhydrate 11 and LA gellan gum 21, and the ammonia alum anhydrate 11, the LA gellan gum 21, and the mannitol aqueous solution 31 were stirred and then left to stand under ambient temperature (FIG. 6(d)). In the initial state immediately after being left to stand, the mixture of the ammonia alum anhydrate 11, the LA gellan gum 21, and the mannitol aqueous solution 31 is a slurry mixture 32 as shown in FIG. 6(e); however, the ammonia alum anhydrate 11 and the water 12 cause a hydration reaction. After completion of this hydration reaction, a solid mixture 33 in which the latent-heat storage material 10 (ammonia alum dodecahydrate), the LA gellan gum 21 and the mannitol 22 were mixed was obtained from the slurry mixture 32 (FIG. 6(f)).

Next, after verifying completion of the hydration reaction, the first container 71 including the solid mixture 33 was immersed in water in a water bath 73 set to a water temperature of 95° C. and left to stand. Ammonia alum is melted at 93.5° C. or higher, and the LA gellan gum 21 is dissolved in water at about 85° C. or higher, and accordingly the solid mixture 33 in the first container 71 was completely dissolved to obtain a liquefied liquid mixture 34 (FIG. 6(g)). The LA gellan gum 21 is homogeneously dispersed due to the generation of the liquid mixture 34.

After that, the first container 71 including the liquid mixture 34 was taken out of the water bath 73 and left to stand under room temperature. Because of this, the liquid mixture 34 was solidified to obtain a latent-heat storage material composition 1 (FIG. 6(h)). In the composition of the obtained latent-heat storage material composition 1, ammonia alum dodecahydrate (latent-heat storage material 10) was 91 wt %, mannitol (melting point modifier 22) was 8 wt %, and LA gellan gum (thickener 21) was 1 wt %, and this latent-heat storage material composition 1 has a property with the melting point adjusted to about 90° C.

Figure 7:
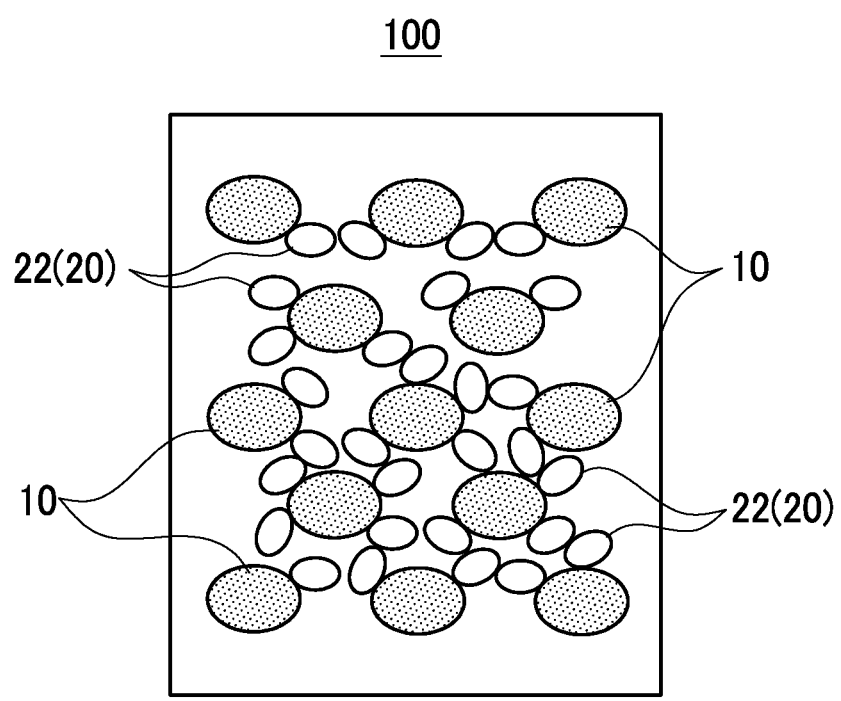
FIG. 7 is an explanatory diagram schematically showing a latent-heat storage material composition according to Comparative Example.

Next, a latent-heat storage material composition 100, which is an original sample used in Experiment 2, will be described using FIG. 7. FIG. 7 is an explanatory diagram which schematically shows the latent-heat storage material composition according to Comparative Example. As shown in FIG. 7, the latent-heat storage material composition 100 according to Comparative Example in Experiment 2 is a mixture of ammonia alum dodecahydrate (latent-heat storage material 10) and mannitol (melting point modifier 22), and LA gellan gum (thickener 21) is not mixed therein unlike the latent-heat storage material composition 1 according to Example.

In addition, the production procedure for this latent-heat storage material composition 100 is substantially the same as the above-mentioned production procedure for the latent-heat storage material composition 1 except that the thickener 21 is not included, and therefore the description of the production procedure for the latent-heat storage material composition 100 is omitted.

Next, the experimental method will be described. In Experiment 1, the latent-heat storage material composition 1 prepared by the above-described production procedure, which had been sealed in the first container 71 made from polypropylene (FIG. 6 (h)), was immersed in water in a water bath (not shown) set to a water temperature of 95° C. and left to stand. Because a water temperature of 95° C. is a temperature higher than the melting point (about 90° C.) of the latent-heat storage material composition 1, the latent-heat storage material composition 1 was melted to obtain a melt, and heat was stored in the latent-heat storage material composition 1 by hot water in the water bath. After that, the first container 71 including the latent-heat storage material composition 1 was taken out of the water bath, and left to stand under ambient temperature. Because of this, the latent-heat storage material composition 1 was completely solidified, and heat was released in the latent-heat storage material composition 1.

As described above, after one heat storage and release cycle by the latent-heat storage material composition 1, about 10 mg of the samples were each sampled from the upper surface side 1a and the lower surface side 1b of this latent-heat storage material composition 1 as shown in FIG. 6(h). Using a well-known differential scanning calorimetric measurement device (DSC: differential scanning calorimetry), the amount of heat storage of a sample was measured with about 10 mg of the sample placed on a sample table thereof exposed to an atmosphere gas with air at 30 ml/min and sealed. Specifically, a sample was heated at a heating speed of 2° C./min from ambient temperature to 90° C., and then retained at a temperature of 90° C. for 20 minutes to store heat in the sample. In this period, the amount of heat absorbed in or released from the sample was measured to find an amount of heat storage.

In Experiment 2, as with the case of the latent-heat storage material composition 1, about 10 mg of samples were each sampled from the upper surface side and the lower surface side of the latent-heat storage material composition 100 based on the same experimental method as that of the latent-heat storage material composition 1. While storing heat in a sample, the amount of heat absorbed in or released from the sample was measured under the same conditions as above to find an amount of heat storage.

In addition, in Experiments 1 and 2, if the components of the latent-heat storage material composition 1 according to Example are homogeneously dispersed, a hypothesis that there is not a great change in the melting behavior of the latent-heat storage material composition 1 between a sample on the upper surface side 1a and a sample on the lower surface side 1b is established. Conversely, if the components are separated due to a difference in density thereof, a hypothesis that there is a great difference in the melting behavior of the latent-heat storage material composition 1 between a sample on the upper surface side 1a and a sample on the lower surface side 1b is established. Similarly, these two hypotheses are also established in the latent-heat storage material composition 100 according to Comparative Example.

Figure 9:
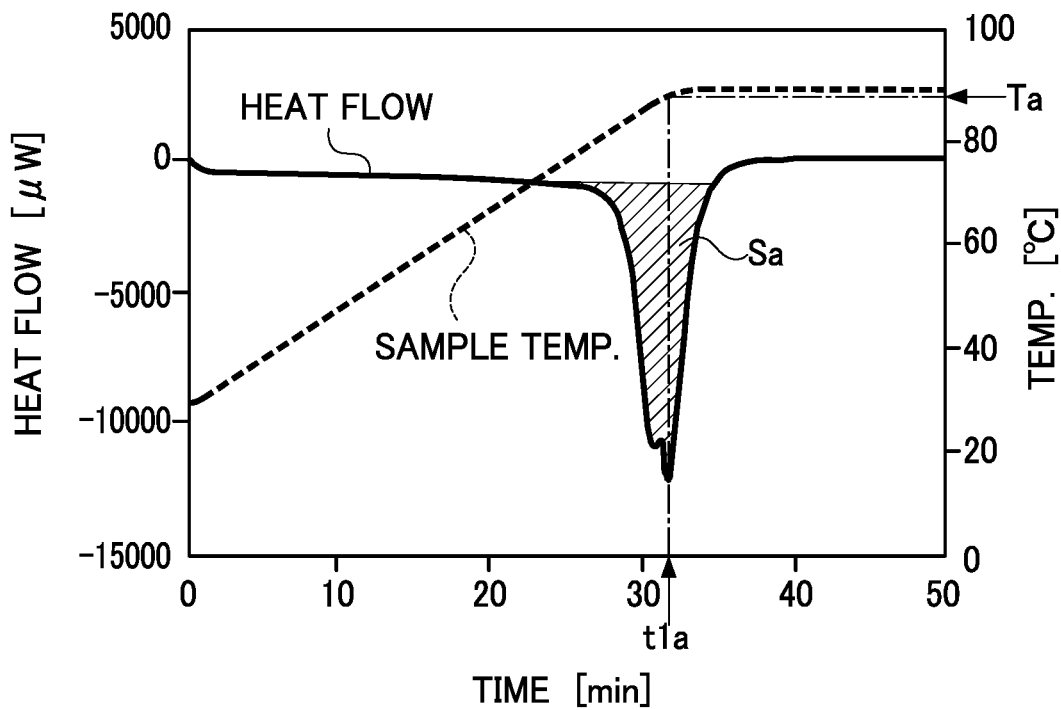
FIG. 9 is a graph showing the time course of the change in temperature and amount of heat storage of the latent-heat storage material composition according to Example of the embodiment, and showing the experimental results obtained by measuring the amount of heat storage of a sample on the upper surface side.
Figure 10:
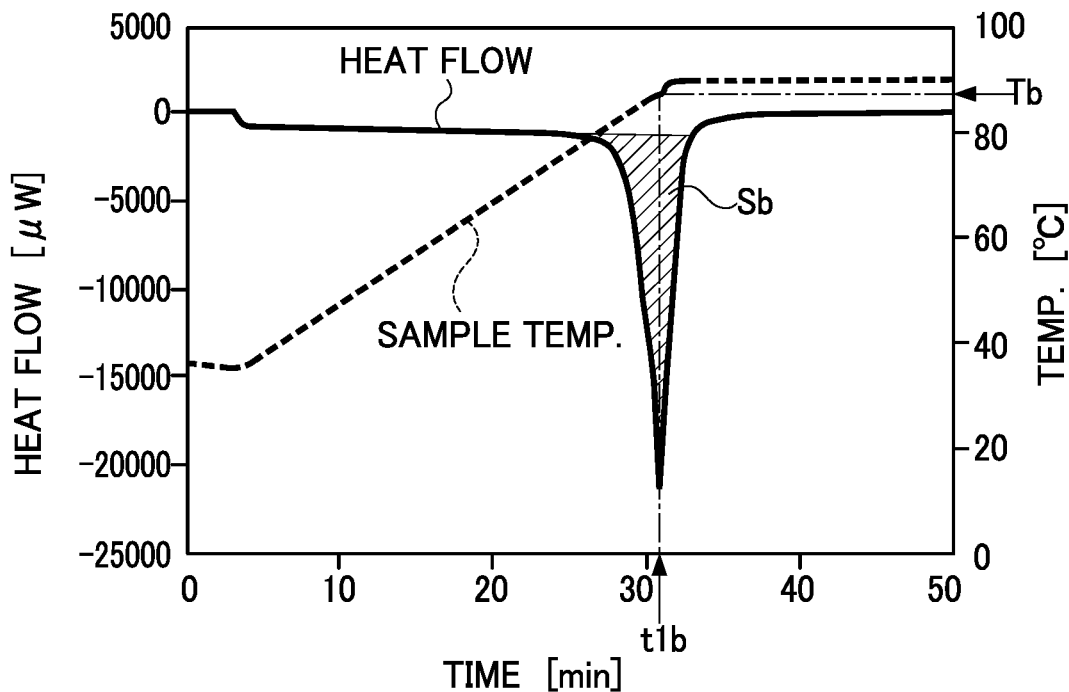
FIG. 10 is a graph showing the experimental results obtained by measuring the amount of heat storage of a sample on the lower surface side, subsequently to FIG. 9.
Figure 11:
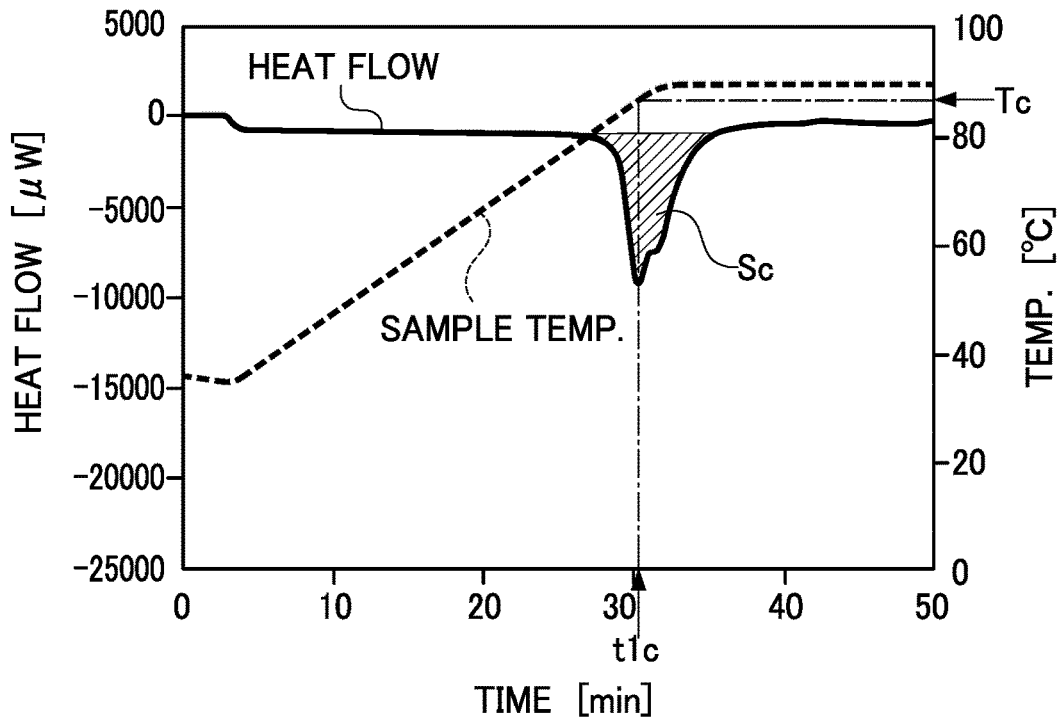
FIG. 11 is a graph showing the time course of the change in temperature and amount of heat storage of the latent-heat storage material composition according to Comparative Example, and showing the experimental results obtained by measuring the amount of heat storage of a sample on the upper surface side.
Figure 12:
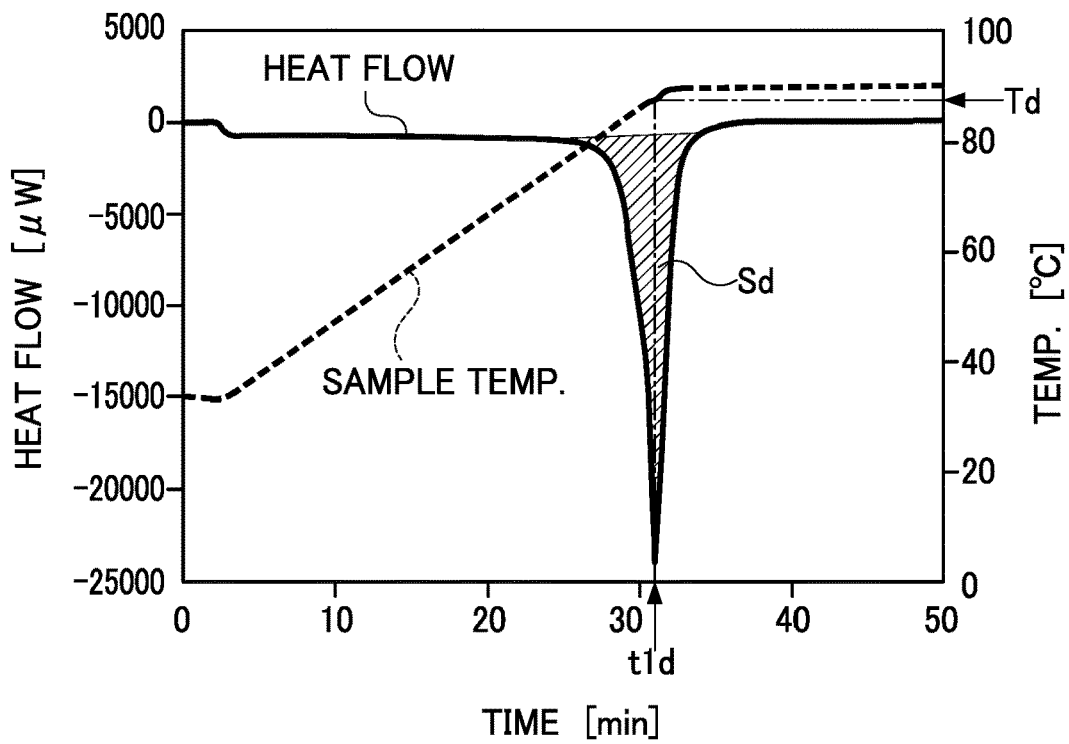
FIG. 12 is a graph showing the experimental results obtained by measuring the amount of heat storage of a sample on the lower surface side, subsequently to FIG. 11.

FIG. 8 is a table relating to the latent-heat storage material composition according to Example, in which the experiment conditions employed in Experiments 1 and 2 according to Example and Comparative Example and the measurement results of the melting point and amount of heat storage measured by DSC are shown together. FIG. 9 is a graph showing the time course of the change in temperature and amount of heat storage of the latent-heat storage material composition according to Example of the embodiment, and shows the experimental results obtained by measuring the amount of heat storage of a sample on the upper surface side. Subsequently to FIG. 9, FIG. 10 is a graph showing the experimental results obtained by measuring the amount of heat storage of a sample on the lower surface side. FIG. 11 is a graph showing the time course of the change in temperature and amount of heat storage of the latent-heat storage material composition according to Comparative Example, and shows the experimental results obtained by measuring the amount of heat storage of a sample on the upper surface side. Subsequently to FIG. 11, FIG. 12 is a graph showing the experimental results obtained by measuring the amount of heat storage of a sample on the lower surface side.

In each of the graphs shown in FIG. 9 to FIG. 12, the scale on the left-side vertical axis shows the amount of heat stored in or released from a sample per unit time, and a value indicated in the "negative" zone in the scale shows the amount of heat absorbed in a sample and a value indicated in the "positive" zone in the scale shows the amount of heat released from a sample. In a line figure showing a heat flow that varies with the elapse of time, a sample shows the maximum amount of heat storage at a temperature T of the sample corresponding to time t at which the absolute value of the heat flow increases temporarily and reaches the maximum value (peat top) (wherein the temperature T is defined as a melting point). In each of the line figures showing heat flows, the latent heat of fusion of a sample is expressed in the size of a peak area S (a shaded area in each of FIG. 9 to FIG. 12) which is determined by integrating heat flows in a time range between a time point at which a peak of the amount of heat storage starts and a time point at which the peak is ended. The unit for the heat amount of a sample is expressed in [μW], and the unit for the mass of a sample is expressed in [mg]. The unit for the amount of heat storage is converted and is expressed in [kJ/kg].

<Results of Experiments>

In the sample on the upper surface side 1a according to the latent-heat storage material composition 1 of Example, as shown in FIG. 9, the temperature Ta corresponding to the melting peak time t1a was 89° C. and the amount of heat storage Sa was 221 kJ/kg. In the sample on the lower surface side 1b, as shown in FIG. 10, the temperature Tb corresponding to the melting peak time t1b was 87° C. and the amount of heat storage Sb was 223 kJ/kg.

Conversely, in the sample on the upper surface side according to the latent-heat storage material composition 100 of Comparative Example, as shown in FIG. 11, the temperature Tc corresponding to the melting peak time t1c was 87° C. and the amount of heat storage Sc was 157 kJ/kg. In the sample on the lower surface side, as shown in FIG. 12, the temperature Td corresponding to the melting peak time t1d was 87° C. and the amount of heat storage Sd was 253 kJ/kg.

<Discussion>

In the above-described hypotheses, from the results of Experiment 1, it is assumed that the concentrations of ammonia alum dodecahydrate (latent-heat storage material 10), mannitol (melting point modifier 22), and LA gellan gum (thickener 21), which are the components of the latent-heat storage material composition 1, are each almost the same between the upper surface side 1a and the lower surface side 1b. As the reason for such a phenomenon, it is considered that the separation of the components of the latent-heat storage material 10 and the melting point modifier 22 due to a difference in density is prevented by the LA gellan gum 21 mixed in the latent-heat storage material composition 1. Therefore, it is considered that the LA gellan gum 21 has the action of being a binder for each component and functions as a thickener in the latent-heat storage material composition 1.

Conversely, from the results of Experiment 2, it is assumed that there is a difference in the concentrations of ammonia alum dodecahydrate (latent-heat storage material 10) and mannitol (melting point modifier 22), which are the components of the latent-heat storage material composition 100, between the upper surface side and the lower surface side. As the reason of such phenomenon, it is considered that an additive which function as a binder between the components of the latent-heat storage material composition 100 is not contained in the latent-heat storage material composition 100. Therefore, it is considered that the separation of the components of the latent-heat storage material 10 and the melting point modifier 22 occurs due to a difference in density, the distribution of these components is not kept homogeneous in both the sample on the upper surface side and the sample on the lower surface side, and properties such as the amount of heat storage of the latent-heat storage material composition 100 vary.

Next, the action and effect of the latent-heat storage material composition 1 and the latent-heat storage tank 60 of the present embodiment will be described. The latent-heat storage material composition 1 of the present embodiment is a latent-heat storage material composition 1 in which a latent-heat storage material 10 capable of storing heat or releasing heat utilizing the absorption or release of latent heat in association with phase change is mixed with an additive 20 capable of adjusting a property of the latent-heat storage material 10, the latent-heat storage material composition being characterized in that the additive 20 is a water-soluble substance belonging to a polysaccharide as a first additive and is a thickener 21 to increase the viscosity of a melt of the latent-heat storage material composition 1 in the state of a liquid phase based on interaction of the thickener 21 with water 12 and a cation 30 included in the latent-heat storage material composition 1, that the thickener 21 is gellan gum, and that the mixing amount of gellan gum relative to the whole weight of the latent-heat storage material composition 1 is 1 wt % or less.

The latent-heat storage material composition 1 according to the present embodiment is a latent-heat storage material composition 1 in which a latent-heat storage material 10 capable of storing heat or releasing heat utilizing the absorption or release of latent heat in association with phase change is mixed with an additive 20 capable of adjusting a property of the latent-heat storage material 10, the latent-heat storage material composition 1 being characterized in that the latent-heat storage material composition 1 is used by repeating several times a heat storage and release cycle by phase change between a liquid phase and a solid phase with the latent-heat storage material packed in a container such as the exemplified heat storage material packaging container 50, that the additive 20 is a water-soluble substance belonging to a polysaccharide as a first additive and is a thickener 21 to increase the viscosity of a melt of the latent-heat storage material composition 1 in the state of a liquid phase based on interaction of the thickener 21 with water and a cation included in the latent-heat storage material composition 1, that the thickener 21 is dissolved in water included in the latent-heat storage material composition 1 to have a random coil structure when the latent-heat storage material composition 1 is in a temperature range of the state of a liquid phase, while, when the latent-heat storage material composition 1 is in a temperature range before changing from the state of a liquid phase to the state of a complete solid phase, the structure of the thickener changes into a double spiral structure reversible from the random coil structure and also the thickener has a property to cause gelation by the assembly of the double spiral structures next to each other based on the presence of the cation 30, that the mixing amount of the thickener 21 relative to the whole weight of the latent-heat storage material composition 1 is 1 wt % or less, and that the latent-heat storage material composition 1 is formed in a state in which the separation of the components of the latent-heat storage material composition 1 due to a difference in density is prevented by the thickener 21.

Due to such a characteristic feature, when the latent-heat storage material composition 1 is in a melt state, the viscosity of the latent-heat storage material composition 1 increases and accordingly a phase separation phenomenon of the latent-heat storage material 10 can be prevented, and the components of the latent-heat storage material composition 1 can be homogeneously dispersed. In addition to the phase separation phenomenon, also in the case where the latent-heat storage material composition is mixed with other additives 20 such as a melting point modifier 22 and a supercooling inhibitor other than the thickener 21, the separation of the additives 20 other than the thickener 21 and the latent-heat storage material 10 due to a difference in density of the components can be prevented, and the components of the latent-heat storage material composition 1 can be homogeneously dispersed.

Furthermore, the thickener 21 is LA gellan gum, one type of gellan gum, in the present embodiment, and LA gellan gum itself does not have heat storage performance. However, the gelation of the LA gellan gum 21 is promoted by only adding the thickener 21 (LA gellan gum 21) to the latent-heat storage material 10 (ammonia alum dodecahydrate) in a small amount, for example, slightly 1.0 wt % or less. Therefore, the viscosity of a melt of the latent-heat storage material composition 1 can be increased to a viscosity sufficient to prevent the separation of the components due to a difference in density. Furthermore, in the melt of the latent-heat storage material composition 1, the components are homogeneously dispersed, and the separation of the components of the latent-heat storage material composition 1 can be more effectively prevented, and accordingly even when the latent-heat storage material composition 1 repeats phase change between a liquid phase and a solid phase several times, the distribution of the components can be kept homogeneous. Therefore, properties such as the melting point and freezing point of the latent-heat storage material composition 1 can be prevented from varying.

In addition, because the amount of the LA gellan gum 21 added is slight, 1.0 wt % or less, even when the latent-heat storage material composition 1 is mixed with the thickener 21, a reduction in the amount of heat storage per volume is prevented in the latent-heat storage material composition 1. There is less difference between the amount of heat storage of the latent-heat storage material composition 1 including the LA gellan gum 21 and the amount of heat storage of the latent-heat storage material 10 alone in the same volume ratio, and the latent-heat storage material composition 1 can maintain a higher amount of heat storage.

In addition, because the thickener 21 is LA gellan gum, which has a property of acid resistance, even when a melt of, for example, ammonia alum dodecahydrate or potassium alum dodecahydrate has a property of acidity, the latent-heat storage material composition 1 is not denatured or deteriorated over time due to the addition of the LA gellan gum 21.

Furthermore, unlike xanthan gum, sodium alginate, carboxymethyl cellulose (CMC), and the like which are widely used as a thickener, even when the LA gellan gum 21 is mixed with alum hydrate such as ammonia alum dodecahydrate (latent-heat storage material 10) and heated to not lower than the melting point under sealed conditions, the LA gellan gum 21 does not cause a chemical reaction with alum hydrate, and can maintain a function as a thickener 21. Furthermore, the LA gellan gum 21 is widely distributed in the market, and is therefore easily commercially available and inexpensive. Furthermore, the LA gellan gum 21 is non-toxic and a non-hazardous material and is thus easy to handle.

Therefore, even when the latent-heat storage material 10 is mixed with the additives 20 (thickener 21, melting point modifier 22), the latent-heat storage material composition 1 according to the present embodiment shows excellent effects such that the forming components can be kept stable over time and homogeneously mixed and also a larger amount of heat storage can be obtained.

In addition, the latent-heat storage material composition 1 according to the present embodiment is characterized in that the main component of the latent-heat storage material 10 is alum hydrate.

Due to this characteristic feature, for example, the latent-heat storage material 10, which is an alum hydrate such as ammonia alum dodecahydrate, has a property of relatively large latent heat in association with phase change. Therefore, the latent-heat storage material 10 with such property has a relatively large amount of heat storage capable of storing heat. Therefore, the latent-heat storage material composition 1 including the latent-heat storage material 10, alum hydrate, is excellent because the latent-heat storage material composition has heat storage-release performance to store a large capacity of heat and release the heat.

In particular, when the latent-heat storage material 10 is ammonia alum dodecahydrate, ammonia alum dodecahydrate has a density of 1.64 $g/cm^3$ and an amount of heat storage per volume of about 250 to 270 kJ/kg, and the amount of heat storage of ammonia alum dodecahydrate is large among various latent-heat storage materials. Therefore, the latent-heat storage material composition 1 in which LA gellan gum (thickener 21) is added to ammonia alum dodecahydrate (latent-heat storage material 10) can also have a relatively large amount of heat storage, above 220 kJ/kg.

In addition, the latent-heat storage material composition 1 according to the present embodiment is characterized in that alum hydrate is ammonia alum dodecahydrate ($AlNH_4(SO_4)_2 \cdot 12H_2O$) or potassium alum dodecahydrate ($AlK(SO_4)_2 \cdot 12H_2O$).

Due to this characteristic feature, ammonia alum dodecahydrate and potassium alum dodecahydrate are widely distributed in the market, and are therefore easily commercially available and inexpensive.

In addition, the latent-heat storage material composition 1 according to the present embodiment is characterized in that the cation 30 is a positive ion constituting alum hydrate.

Due to this characteristic feature, alum hydrate is a supply source for the cation 30, and therefore it is not required to add an additive separately from the thickener 21 to promote gelation of LA gellan gum 21, the thickener 21, and to improve the strength of gel texture of HA gellan gum 21A.

In addition, the latent-heat storage material composition 1 according to the present embodiment is characterized in that the second additive 20 (melting point modifier 22), which is another additive different from the first additive 20 (thickener 21), is mixed, and the second additive 20 is the melting point modifier 22 to adjust the melting point of the latent-heat storage material 10 and is a substance having a property to generate negative dissolution heat upon being dissolved in the latent-heat storage material 10.

Due to this characteristic feature, water capable of dissolving the melting point modifier 22 is included in a structure forming the latent-heat storage material composition 1 (ammonia alum dodecahydrate which is the latent-heat storage material 10), and accordingly, in the latent-heat storage material composition 1 having such latent-heat storage material 10 as the main component, the amount of heat storage that can be stored in the latent-heat storage material composition 1 can be increased because the amount of heat storage is the sum total of relatively large latent heat of fusion and negative dissolution heat.

In addition, the latent-heat storage tank 60 according to the present embodiment is characterized in that in the latent-heat storage tank 60 equipped with the latent-heat storage material composition 1 in which the latent-heat storage material 10 capable of storing heat or releasing heat utilizing the absorption or release of latent heat in association with phase change is mixed with the additive 20 capable of adjusting the property of the latent-heat storage material 10, the heat medium 61 which is a medium to transfer heat from/to the latent-heat storage material composition 1, and a heat storage material packaging container 50 which divides the latent-heat storage material composition 1 and the heat medium 61 in the inner part of the tank 60, the latent-heat storage material composition 1 is the latent-heat storage material composition 1 according to the present embodiment mentioned above.

Due to this characteristic feature, even when the latent-heat storage material composition 1 repeats a heat storage and release cycle several times, the separation of the components of the latent-heat storage material composition 1 due to a difference in density is prevented. Therefore, like the latent-heat storage tank 60 provided as an example in FIG. 13, the latent-heat storage material composition 1 can stably maintain the initial state of its heat storage performance for a long period of time, for example, not only in the case where vertically long heat storage material packaging containers 50 packed with the latent-heat storage material composition 1 are housed in the latent-heat storage tank 60 in a vertical arrangement, but also in the case where bag-shaped heat storage material packaging containers packed with the latent-heat storage material composition 1 are arranged in a longitudinal direction (vertical direction in FIG. 13) and housed in a latent-heat storage tank 60.

In particular, even when one heat storage material packaging container 50 has a vertical dimension of, for example, a few to a dozen cm, the present applicant could verify that there was not difference in amount of heat storage of the latent-heat storage material composition 1 between the upper portion and lower portion of this heat storage material packaging container 50 by an experiment.

As described above, the present invention has been described by Example and Modified Example of the embodiment. It should be noted, however, that the present invention is not limited to Example and Modified Example of the above embodiment, and can be applied with proper changes without departing from the main points.

(1) For example, the thickener 21 is LA gellan gum 21 in Example of the embodiment and the thickener 21 is HA gellan gum 21A in Modified Example thereof. However, in addition to the thickeners provided as examples in the embodiment, any thickener can be used as long as the thickener is one which is a water-soluble substance belonging to a polysaccharide such as the substance with properties equivalent to a gellan gum belonging to a hetero polysaccharide as mentioned above, and corresponds to a substance to increase the viscosity of a melt of a latent-heat storage material composition in the state of a liquid phase based on interaction of the substance with water and a cation included in the latent-heat storage material composition. However, the assumption is that a problem does not develop in the use of the latent-heat storage material composition.

(2) In addition, "$NH_4^+$" existing in ammonium aluminum sulfate ($AlNH_4(SO_4)_2$) as the latent-heat storage material 10 is allowed to function as a monovalent cation 30 in the embodiment, which promotes gelation of the LA gellan gum 21 to increase the viscosity of a latent-heat storage material composition 1.

However, in addition to the positive ion existing in the latent-heat storage material, the cation may be a positive ion which is supplied based on an additive mixed with a latent-heat storage material composition, such as "$Na^+$" generated due to dissociation of sodium sulfate anhydrous ($Na_2SO_4$), which is added as a melting point modifier (additive), in water.

In addition, the cation is only required to be a positive ion having a positive electric charge required to cause an electrostatic interaction with a functional group in a molecule of the substance with properties equivalent to a gellan gum or the like so that the above-mentioned substance with properties equivalent to gellan gum or the like has a nature to form a three-dimensional structure such as at least a spiral structure by the interaction between functional groups in a molecule and can show characteristics that these spiral structures are assembled by the electrostatic interaction between the cation supplied from the outside and the functional group in the coexistence of water to form a network structure to promote gelation.

(3) In addition, the melting point of the latent-heat storage material composition 1 was adjusted to about 90° C. by mixing the melting point modifier 22 in the embodiment. However, the melting point temperature of the heat storage material composition adjusted by the melting point modifier is not limited to about 90° C., and may be adjusted to a temperature corresponding to the temperature of a heat source required in a heat destination, which uses heat released from the latent-heat storage material composition.

(4) In the embodiment, the latent-heat storage tank 60 using the latent-heat storage material composition 1 is provided as an example in FIG. 13. However, any structure, form and specification of the latent-heat storage tank may be used as long as the latent-heat storage tank according to the present invention has a structure in which a latent-heat storage material composition or the like and a heat medium are divided in the latent-heat storage tank and heat can be transferred between the latent-heat storage material composition or the like and the heat medium.

INDUSTRIAL APPLICABILITY

As is clearly from the aforementioned description, according to the latent heat storage material composition of the present invention, it is possible to keep forming components stable over time and being homogeneously mixed by adding an additive to a latent-heat storage material, and also obtain a larger amount of heat storage.

REFERENCE SIGNS LIST 1, 100 Latent-heat storage material composition
10 Latent-heat storage material
12 Water
30 Cation
20 Additive
21 Thickener
50 Heat storage material packaging container
60 Latent-heat storage tank
61 Heat medium

The invention claimed is:

1. A latent-heat storage material composition in which a latent-heat storage material capable of storing heat or releasing heat utilizing absorption or release of latent heat in association with phase change is mixed with an additive capable of adjusting a property of the latent-heat storage material, the latent-heat storage material composition comprising the latent-heat storage material, water, and the additive,
wherein the additive comprises at least a first additive that is a water-soluble substance belonging to a polysaccharide and is a thickener to increase viscosity of a melt of the latent-heat storage material composition in a state of a liquid phase based on interaction of the thickener with water and a cation included in the latent-heat storage material composition,
wherein the first additive is dissolved in the water included in the latent-heat storage material composition to have a random coil structure when the latent-heat storage material composition is in a temperature range of a state of a liquid phase, while, when the latent-heat storage material composition is in a temperature range before changing from the state of a liquid phase to a state of a complete solid phase, the structure of the first additive changes into a double spiral structure reversible from the random coil structure and also the first additive has a property to cause gelation by assembly of the double spiral structures next to each other based on presence of the cation in the latent-heat storage material composition, and
wherein a mixing amount of the first additive relative to a whole weight of the latent-heat storage material composition is 1 wt % or less.

2. The latent-heat storage material composition according to claim 1,
wherein the latent-heat storage material composition is packed in a container, and is used by repeating a heat storage and release cycle several times by phase change between a liquid phase and a solid phase with the latent-heat storage material composition packed in the container.

3. The latent-heat storage material composition according to claim 1, wherein a main component of the latent-heat storage material is alum hydrate.

4. The latent-heat storage material composition according to claim 3, wherein the alum hydrate is either ammonia alum dodecahydrate ($AlNH_4(SO_4)_2 \cdot 12H_2O$) or potassium alum dodecahydrate ($AlK(SO_4)_2 \cdot 12H_2O$).

5. The latent-heat storage material composition according to claim 4, wherein the additive further comprises a second additive, different from the first additive, wherein the second additive is a melting point modifier to adjust a melting point of the latent-heat storage material and is a substance having a property to generate negative dissolution heat upon being dissolved in the latent-heat storage material.

6. The latent-heat storage material composition according to claim 3, wherein the cation in the latent-heat storage material composition is a positive ion provided by the alum hydrate.

7. The latent-heat storage material composition according to claim 6, wherein the additive further comprises a second additive, different from the first additive, wherein the second additive is a melting point modifier to adjust a melting point of the latent-heat storage material and is a substance having a property to generate negative dissolution heat upon being dissolved in the latent-heat storage material.

8. The latent-heat storage material composition according to claim 3, wherein the additive further comprises a second additive, different from the first additive, wherein the second additive is a melting point modifier to adjust a melting point of the latent-heat storage material and is a substance having a property to generate negative dissolution heat upon being dissolved in the latent-heat storage material.

9. The latent-heat storage material composition according to claim 1, wherein the additive further comprises a second additive, different from the first additive, wherein the second additive is a melting point modifier to adjust a melting point of the latent-heat storage material and is a substance having a property to generate negative dissolution heat upon being dissolved in the latent-heat storage material.

10. The latent-heat storage material composition according to claim 1, wherein the latent-heat storage material composition is formed in a state in which separation of components of the latent-heat storage material composition due to a difference in density is prevented by the first additive.

11. The latent-heat storage material composition according to claim 1, wherein the first additive is gellan gum.

12. The latent-heat storage material composition according to claim 1, wherein the first additive is a polymer compound formed by linking a plurality of monosaccharide molecules, which may be the same or different, and includes at least one hydrophilic group.

13. The latent-heat storage material composition according to claim 12, wherein the at least one hydrophilic group is a carboxy group.

14. A latent-heat storage tank equipped with a latent-heat storage material composition in which a latent-heat storage material capable of storing heat or releasing heat utilizing absorption or release of latent heat in association with phase change is mixed with an additive capable of adjusting a property of the latent-heat storage material, a heat medium which is a medium to transfer heat from/to the latent-heat storage material composition, and a dividing member to divide the latent-heat storage material composition and the heat medium in the inner part thereof,
   wherein the latent-heat storage material composition is a latent-heat storage material composition according to claim 1.

* * * * *